United States Patent
Burgoon et al.

(10) Patent No.: US 8,651,247 B2
(45) Date of Patent: Feb. 18, 2014

(54) DIRECT DRIVE BRAKING SYSTEM INCLUDING AN INTEGRATED PACKAGE BEARING

(75) Inventors: Donald Burgoon, Gastonia, NC (US); Wenqi Qian, Fort Mill, SC (US)

(73) Assignee: Performance Friction Corporation, Clover, SC (US)

( * ) Notice: Subject to any disclaimer, the term of this patent is extended or adjusted under 35 U.S.C. 154(b) by 713 days.

(21) Appl. No.: 11/910,329

(22) PCT Filed: Apr. 3, 2006

(86) PCT No.: PCT/US2006/012759
§ 371 (c)(1),
(2), (4) Date: Oct. 1, 2007

(87) PCT Pub. No.: WO2006/108080
PCT Pub. Date: Oct. 12, 2006

(65) Prior Publication Data
US 2008/0149435 A1    Jun. 26, 2008

Related U.S. Application Data

(60) Provisional application No. 60/667,503, filed on Apr. 1, 2005.

(51) Int. Cl.
*F16D 65/12* (2006.01)
(52) U.S. Cl.
USPC .................................. 188/218 XL; 188/18 A
(58) Field of Classification Search
USPC ... 188/18 A, 218 XL, 205 R, 206 R; 301/6.1, 301/105.1
See application file for complete search history.

(56) References Cited

U.S. PATENT DOCUMENTS

| | | | |
|---|---|---|---|
| 2,753,959 | A | 7/1956 | Johnson |
| 3,542,166 | A | 11/1970 | Harrison |

(Continued)

FOREIGN PATENT DOCUMENTS

| | | |
|---|---|---|
| DE | 4211868 | 10/1993 |
| DE | 19726674 | 1/1998 |

(Continued)

OTHER PUBLICATIONS

"Braking Power Under Control", Catalogue 2000, pp. 1-19, 35-57.

(Continued)

*Primary Examiner* — Xuan Lan Nguyen
(74) *Attorney, Agent, or Firm* — Roberts Mlotkowski Safran & Cole, P.C.

(57) ABSTRACT

A wheel bearing hub and disc brake rotor assembly for use on vehicles includes a rotor (14) and a wheel mount (24), formed as a package bearing, fastened to the rotor with a connection assembly that promotes in plane torque transfer. The rotor has a flange form as a series of spaced tabs (20), and the wheel bearing hub (14) has a shoulder with complementary spaced tabs (34). The rotor is connected to the bearing hub by clamping a bridge (42) that spans the shoulder tabs over the rotor tabs. A spring clip (50) can be use with the bridge to accommodate thermal expansion of the rotor and eliminate rattling. Torque is transferred from the brake rotor to the bearing hub in a common plane to prevent twisting. In one embodiment, the bearing hub shoulder tabs may be formed by milling or machining slots. In another embodiment, the bearing hub shoulder tabs may be formed by fine-blanking or stamping slots.

21 Claims, 15 Drawing Sheets

(56) References Cited

U.S. PATENT DOCUMENTS

| | | | |
|---|---|---|---|
| 3,773,153 | A | 11/1973 | Smirl |
| 4,102,443 | A | 7/1978 | Kohler et al. |
| 4,108,286 | A | 8/1978 | Gagarin |
| 4,379,501 | A | 4/1983 | Hagiwara et al. |
| 4,416,564 | A | 11/1983 | Billet et al. |
| 4,576,255 | A | 3/1986 | Mery et al. |
| 4,662,482 | A | 5/1987 | Bass |
| 4,886,235 | A | 12/1989 | Thornborrow |
| 5,190,124 | A | 3/1993 | Haneda |
| 5,305,872 | A | 4/1994 | Hutton |
| 5,368,526 | A | 11/1994 | Hynes |
| 5,437,351 | A | 8/1995 | Lindner |
| 5,520,269 | A | 5/1996 | Yamamoto et al. |
| 5,788,026 | A | 8/1998 | Poli |
| 6,076,896 | A | 6/2000 | Bertetti et al. |
| 6,098,764 | A | 8/2000 | Wirth et al. |
| 6,116,386 | A | 9/2000 | Martin |
| 6,247,562 | B1 | 6/2001 | Gotti et al. |
| 6,267,210 | B1 | 7/2001 | Burgoon et al. |
| 6,302,246 | B1 | 10/2001 | Naumann et al. |
| 6,374,956 | B1 | 4/2002 | Naumann et al. |
| 6,446,765 | B1 * | 9/2002 | Dabertrand et al. ......... 188/18 A |
| 6,446,770 | B2 | 9/2002 | Qian et al. |
| 6,467,588 | B1 | 10/2002 | Baumgartner et al. |
| 6,564,913 | B2 * | 5/2003 | Baumgartner et al. . 188/218 XL |
| 6,640,937 | B2 | 11/2003 | Bunker |
| 6,880,682 | B2 * | 4/2005 | Gotti et al. ............... 188/218 XL |
| 2003/0121733 | A1 | 7/2003 | Niebling et al. |
| 2004/0035659 | A1 | 2/2004 | Pacchiana et al. |
| 2004/0178030 | A1 * | 9/2004 | Pacchiana et al. ...... 188/218 XL |

FOREIGN PATENT DOCUMENTS

| | | | |
|---|---|---|---|
| DE | 19807184 | 4/2000 | |
| DE | 101 61 719 A1 | 6/2003 | |
| EP | 0127932 | 12/1984 | |
| EP | 0726406 | 8/1996 | |
| FR | 2056625 | 5/1971 | |
| FR | 2546250 | 11/1984 | |
| GB | 1080035 | 4/1966 | |
| GB | 2184801 | 7/1987 | |
| JP | 6042302 | 12/1975 | |
| JP | 60201127 | 10/1985 | |
| JP | 61241538 | 10/1986 | |
| JP | 6417041 | 1/1989 | |
| JP | 09166168 | 6/1997 | |
| WO | 02/01088 A1 | 1/2002 | |
| WO | WO 0201088 A1 * | 1/2002 | .............. F16D 65/12 |
| WO | WO 03029684 A1 * | 4/2003 | .............. F16D 65/12 |

OTHER PUBLICATIONS

U.S. Appl. No. 10/131,037, filed Apr. 25, 2002.

Extended European Search Report in corresponding European Application No. EP06740597.7 dated Jun. 4, 2010.

* cited by examiner

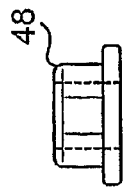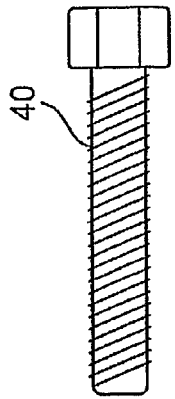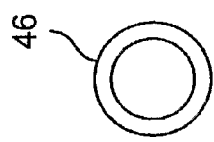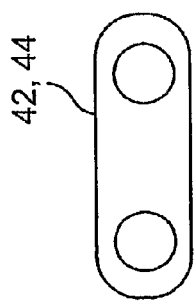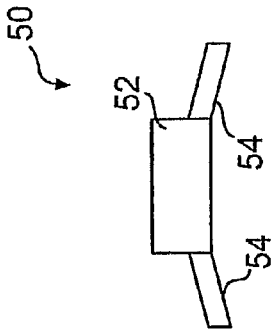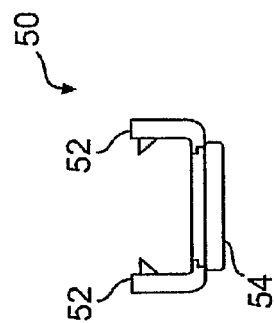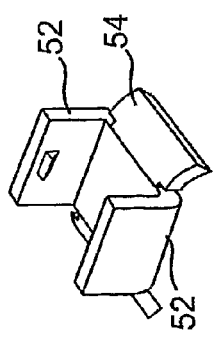

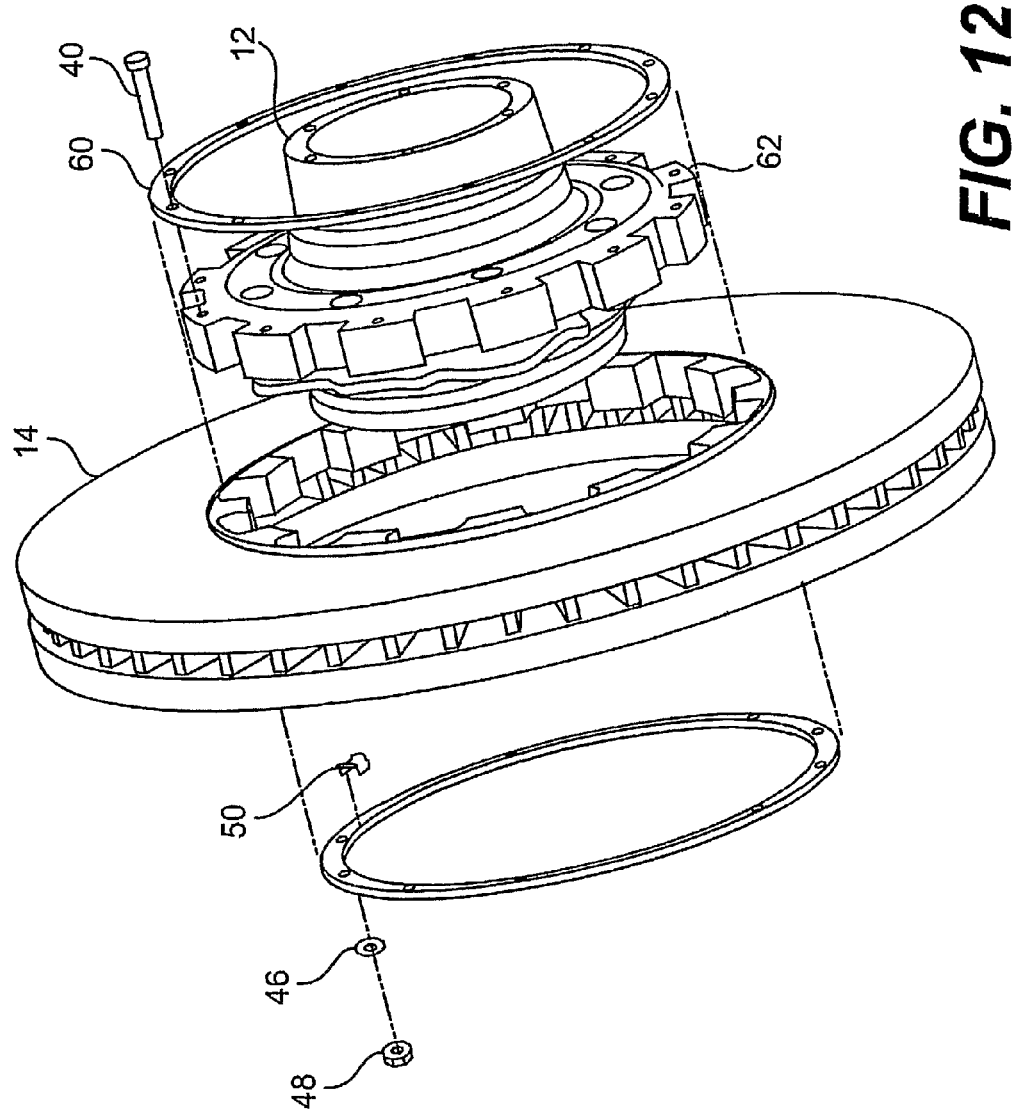

DIRECT DRIVE BRAKING SYSTEM INCLUDING AN INTEGRATED PACKAGE BEARING

This application is related to U.S. Ser. No. 10/404,534 filed Apr. 2, 2003, the contents of which are incorporated by reference herein. This application claims priority from U.S. Provisional Application Ser. No. 60/667,503 filed Apr. 1, 2005. The contents of the provisional application are incorporated by reference herein.

BACKGROUND OF THE INVENTION

1. Field of the Invention

The invention relates to brake assemblies, especially vehicular brakes including brake rotors attached to wheel hubs.

2. Description of Related Art

One type of common prior art brake design for vehicles is a two piece rotor and hub in which a rotor that carries the braking surface is detachably connected to a wheel hub. Another common type of brake design is an integrated one-piece rotor and hub assembly.

Integrated one-piece rotor and hub assemblies have the advantage that no fasteners are required between the rotor and the hub. As a result, the integrated assemblies do not face problems associated with fasteners such as wear and fatigue near fastener openings and potential misalignment due to imperfect machining. A significant drawback, however, is that the assembly is constrained at the hub, which causes thermal distortion of the rotor. Such thermal distortion can damage the rotor and when the rotor is damaged or worn, the entire integrated assembly must be replaced. This is expensive and time consuming.

Complete replacement is avoided by using a two piece rotor and hub assembly, which facilitates rotor replacement. When a rotor becomes worn or cracked, the rotor disc can be detached from the hub for less expensive and easier replacement than with the integrated design. Hat rotors are typically one piece metal castings having a rotor portion integrally cast with a hat portion. The hat portion of the hat rotor is a large flange that fits over a mounting surface of the hub. The hat portion includes wheel stud apertures through which wheel studs can pass. Hat rotors can also be made as two pieces with a flat rotor disc fastened to the hat portion.

Hat rotors, however, also have some drawbacks. In particular, hat rotors and hubs are typically individual metal castings. Subsequent to casting, the hat rotor and the hub must both be individually machined. The machined surfaces of the rotor hat portion, the rotor braking surfaces, and the mounting surface of the hub must all be in the proper plane to minimize rotor run-out, which is the rotational misalignment of the rotor. Specifically, rotor run-out is the measurement of the extent to which the rotor wobbles, or deviates outside the intended plane of rotation, as the rotor rotates with the hub about the wheel shaft. Rotor run-out causes excessive and uneven wear in the rotor braking surfaces and in brake pads which contact the rotor braking surfaces. Rotor run-out also increases thermal distortion of the brake rotor. The thermal distortion results in thermal judder, noise, and vibrations during braking, as well as causing irregular braking pulsations. This can be a significant problem as it is very difficult to achieve perfect machining.

Another deficiency with hat rotor hub assemblies results from the manner in which a hat rotor and a wheel are mounted together on the hub. The hat rotor is installed over a mounting surface of the hub, and then the hat rotor is loosely mounted on the hub until a wheel is subsequently mounted on the hub. As wheel lug nuts are tightened to the wheel studs, the hat rotor is sandwiched between the wheel and the hub, thus securing the hat rotor to the hub. However, if the wheel lug nuts are not evenly tightened, the uneven forces acting on the hub may result in the distortion of the hub. Additionally, if the wheel rim has been improperly manufactured, the wheel rim might impose a distortion on the hub as the lug nuts are tightened. Any distortion on the hub will be directly transferred to the rotor, as the portion of the hub that is potentially distorted is also the mounting surface for the rotor in all hat rotor designs. This induces stresses in the rotor.

A further concern of both integrated rotor hubs and hat rotor hubs is that the rotor in both of these designs is fixed with respect to the hub. During braking, the rotor in such an assembly is subjected to high frictional forces that generate heat in the rotor causing thermal expansion/distortion, temperature variation across the face of the rotor, and heat transfer to the adjacent components including the hub and the bearings. Thermal expansion of the rotor is very limited because of the integral connection between the rotor and the hub. This creates thermal coning in the rotor surface and a large thermal gradient, which will induce high thermal stress leading to thermal cracking. The high thermal gradient generated during braking and the effects of the thermal expansion and distortion can cause vibration and thermal judder across the brake surfaces, resulting in rough or irregular braking pulsations. The high thermal stress and thermal distortion also reduce the life and performance of the rotor and increase maintenance costs.

One way the thermal stresses have been addressed is to provide a "floating" rotor in which the fastener connection between the rotor and the hat or hub is provided with a small clearance or float that allows thermal expansion. Two-piece rotors also allow greater flexibility with respect to use with different hubs as the same rotor disc can be used with different hat portions. This reduces the cost since generic rotor discs may be used and only the hat portion requires specialized casting, tooling and machining steps. However, stresses induced by fastener assemblies in this design are also a consideration in two-piece hat rotors.

Typical rotor discs in two-piece hat designs have an attachment flange that is perforated to accept a fastener. The hat portion is placed on one side of the attachment flange and a fastener connects the hat portion to the side of the attachment flange. During braking, a frictional force is applied to the rotor surface, which creates torque that is transferred to the attachment flange, to the fastener, through the hat portion and to the hub. Because the hat portion is attached to one side of the attachment flange, which is in a plane axially displaced from the friction braking surface, a moment arm is created at this connection joint. When the torque is transferred through a moment arm, bending stresses are formed in the connection. This creates twisting in the areas adjacent the fastener, which can create fatigue leading to cracking and breaking. The perforated flange tends to become fatigued because the material of the rotor, cast iron for example, weakens at high temperatures leading to fatigue fractures. This also creates problems with run-out, as discussed above, along with premature fracture of components in the connection.

Torque transfer also tends to be non-uniform through the perforated flange, especially in a floating design, as the machining tolerance at each aperture causes certain connections to receive more torque than other connections. This creates high stresses at individual apertures and can cause the attachment flange to crack or to have portions break off.

The two-piece hat rotor assemblies discussed above also have drawbacks associated with the hat portion, which typically has slots that match with the perforations in the rotor attachment flange. Some floating type two piece hat rotor assemblies use a spacer, sometimes called a bobbin, to provide the clearance that accommodates thermal expansion. The bobbin fits in the slots of the hat piece or in slots of the rotor flange, and when torque is applied to the hat through the rotor, the bobbin twists in the slot. This twisting causes the edges of the bobbin, which are typically square to match the slot, to gouge the sides of the slots, thus damaging the slotted piece. This is especially true when the hat piece is manufactured from a material having a lower hardness, such as aluminum, which is popular in high performance and racing applications, or when the rotor is formed of cast iron.

Another issue related to vehicular wheel assemblies is proper wheel end bearing settings to maximize bearing seal and tire life. If the wheel end bearing is out of adjustment, the bearing can become damaged, which increases cost for repairs and replacement parts and adversely affects reliability. Improper wheel end bearing adjustments also harm tire life and the entire braking assembly. This problem is significant for the trucking industry as it is costly and increases downtime.

As a result, the manufacturers have addressed this problem with preassembled package bearings that can be presealed, prelubricated and preset. They can be provided with or without the spindle in place. The integrated unit is bolted directly to the wheel and is suitable for driven and non-driven wheels. These assemblies can increase load capacity and reduce the problems discussed above, especially in medium and heavy duty truck applications.

However, package bearings must be connected to the braking system, which in turn can have stress induced issues relating to the brake rotors. As discussed above, prior art brake rotors have suffered from problems associated with wear and material fatigue due to stresses induced during the braking process, particularly bending stresses caused during torque transfer and non-uniform transfer of torque caused by machining tolerances.

It would be desirable to reduce the stresses experienced by the rotor and, in the case of a two piece rotor, the hat piece to increase performance and durability. It would be very cost effective to address these problems in combination with package bearings as they are used in concert during vehicular application.

There is a need, therefore, to provide a brake rotor and wheel hub assembly that eliminates bending stresses and promotes uniform torque transfer. It would be desirable to provide a brake rotor assembly that minimizes bending stresses, fatigue stress and accommodates machining inconsistencies to increase the life and reliability of the brake device. Moreover, it would be highly desirable to provide a package bearing that could be installed in combination with a brake rotor in an assembly that promoted uniform torque transfer.

SUMMARY OF THE INVENTION

An aspect of the invention provides a fastening assembly associated with a hub to connect the rotor disc in a way that provides in plane torque transfer.

Another aspect of the invention provides a package bearing that is configured to connect to a rotor to accommodate thermal expansion of the rotor.

An additional aspect of the invention provides a rotor and hub connection that uses less components and is therefore less expensive to manufacture.

Another aspect of the invention provides a fastener assembly that securely clamps a rotor to a wheel hub.

An aspect of the invention also provides a spring at the fastener connection to minimize or prevent rattling of the rotor assembly during use.

An additional aspect of the invention provides a package bearing and rotor with complementary attachment flanges having tabs, wherein the rotor tabs can be clamped to the package bearing and can eliminate fatigue fractures and/or stress concentrations typically associated with perforated attachment flanges, to enhance performance and durability.

The invention is directed to a vehicle wheel hub and bearing assembly comprising a disc brake rotor having a braking surface and an attachment flange, a package wheel bearing hub having a disc brake rotor mounting flange with a surface for attachment to a disc brake rotor, and a fastener assembly that couples the attachment flange of the disc brake rotor to the disc brake rotor mounting flange of the package wheel bearing hub. The attachment flange has a plurality of rotor tabs, and the disc brake rotor mounting flange has a shoulder with shoulder tabs for engagement with the rotor tabs. The fastener assembly includes a bridge and fastener, wherein the fastener extends through the shoulder tabs and the bridge to clamp over the rotor tabs and secure the rotor tabs between the shoulder tabs. A spring may be disposed between the bridge and an associated rotor tab to bias the rotor tab against the bridge.

The invention is additionally directed to the package wheel bearing for use in a vehicle wheel assembly including a vehicle frame, a vehicle wheel and a brake rotor. The package bearing comprises a hub including lubricated bearings, a fixed upright mounting portion supported by the hub for connection to the vehicle frame, and a rotatable wheel mounting portion supported by the hub for rotation. The wheel mounting portion includes a wheel mounting flange with a surface for attachment to the vehicle wheel and a disc brake rotor mounting flange for engagement with the brake rotor. The disc brake rotor mounting flange has a shoulder with shoulder tabs formed therein defining a plurality of slots between adjacent shoulder tabs configured to connect with the brake rotor. The slots can be through slots or blank slots.

The invention is also directed to a method of forming a package bearing, comprising the steps of providing a package bearing with a disc brake rotor mounting flange and a hub, forming a shoulder mounting flange on the hub, forming a plurality of slots in the shoulder and thus creating a pair of shoulder tabs between each slot, and forming at least one hole in each shoulder tab. Forming the slots can include milling, machining, fine-blanking, or stamping.

These and other aspects of the invention will become apparent in view of the detailed description and drawings herein.

BRIEF DESCRIPTION OF THE DRAWINGS

The invention is described in conjunction with the following drawings in which like reference numerals designate like elements and wherein:

FIG. 2 is a side view of a bolt of the fastening assembly in accordance with the invention;

FIG. 3 is a top view of a bridge component of the fastening assembly;

FIG. 4 is a top view of a washer of the fastening assembly;

FIG. 5 is a side view of a nut of the fastening assembly;

FIG. 6 is a perspective side view of the spacer of the fastening assembly;

FIG. 7 is a front view of the spacer of FIG. 6;

FIG. 8 is a side view of the spacer of FIG. 6;

FIG. 12 is an exploded side perspective view of the first embodiment of the package bearing and rotor in accordance with the invention used with a second embodiment of the bridge component;

DETAILED DESCRIPTION OF PREFERRED EMBODIMENTS

The wheel bearing hub and disc brake rotor assembly 10 described herein is preferred for use on vehicles, including automobiles, racing vehicles, trucks, heavy duty trucks, motorcycles and the like. The vehicles particularly suitable for use with this invention can include those vehicles having a gross vehicle weight of about 5,000 pounds and above. However, the inventive concepts discussed herein can be used in any type of application that uses rotary brakes, including automotive, other types of motorized vehicles, or railcars.

Figure 1:
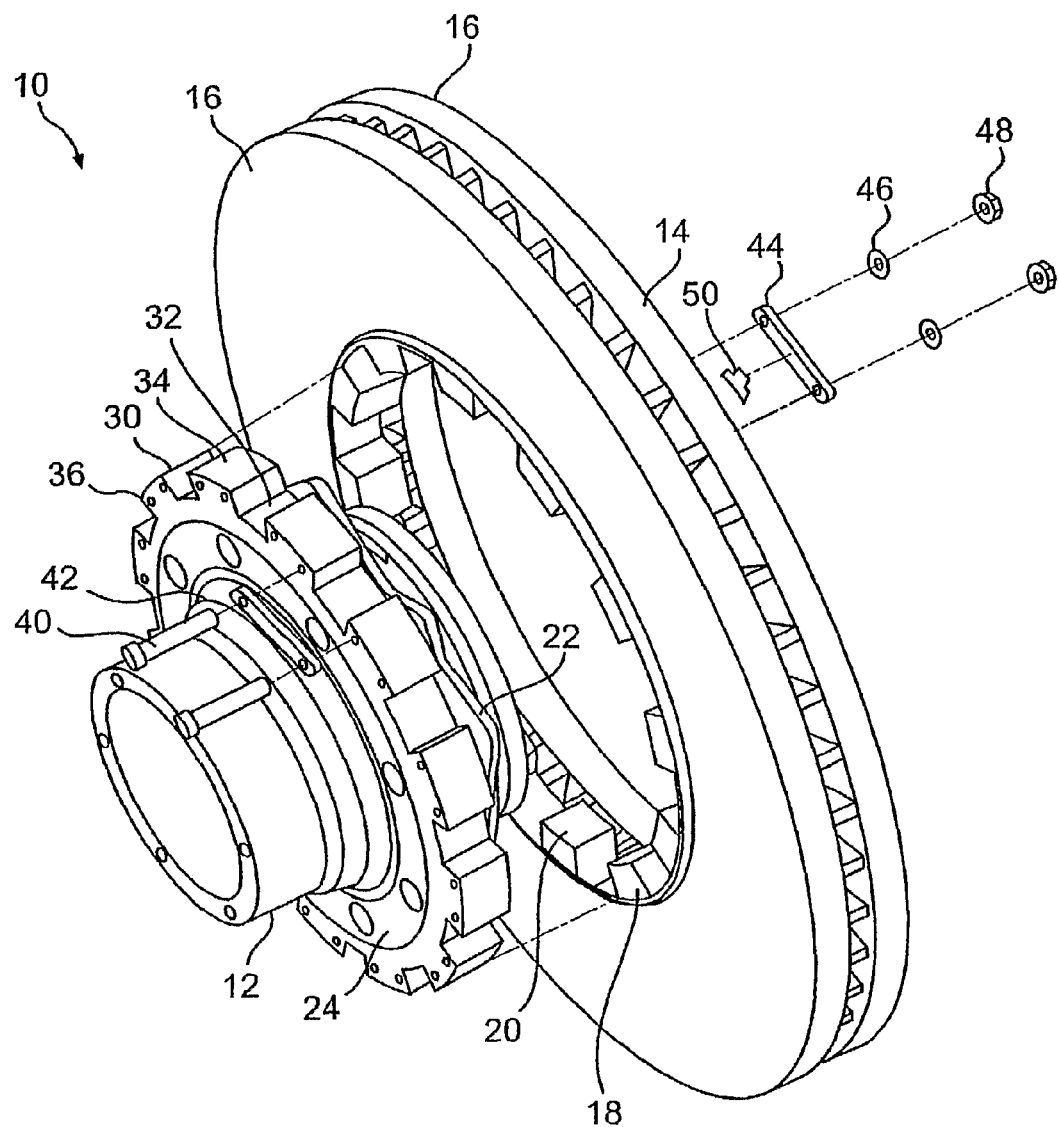
FIG. 1 is an exploded perspective view of the package bearing and rotor in accordance with the invention showing a first embodiment of the package bearing and the bridge.

FIG. 1 shows an integrated assembly 10 that includes a package wheel bearing hub 12, also called a package bearing, and a disc brake rotor 14, also called a rotor disc. The rotor disc 14 is formed as an annular plate having a braking surface 16 and an attachment flange 18. As known, the braking surface 16 preferably carries a high friction material or can be specially treated. Any surface configuration could be used, including a smooth or textured braking surface. The rotor disc 14, as seen herein, is a ventilated rotor having a pair of opposed braking surfaces 16 separated by vanes. Rotor disc 14 is preferably made of cast iron. For example, a suitable material would be Class 30 cast iron, which has a tensile strength of about 35 ksi and a yield strength of about 28 ksi. Of course, different disc configurations can be used, including a single plate.

Figure 16:
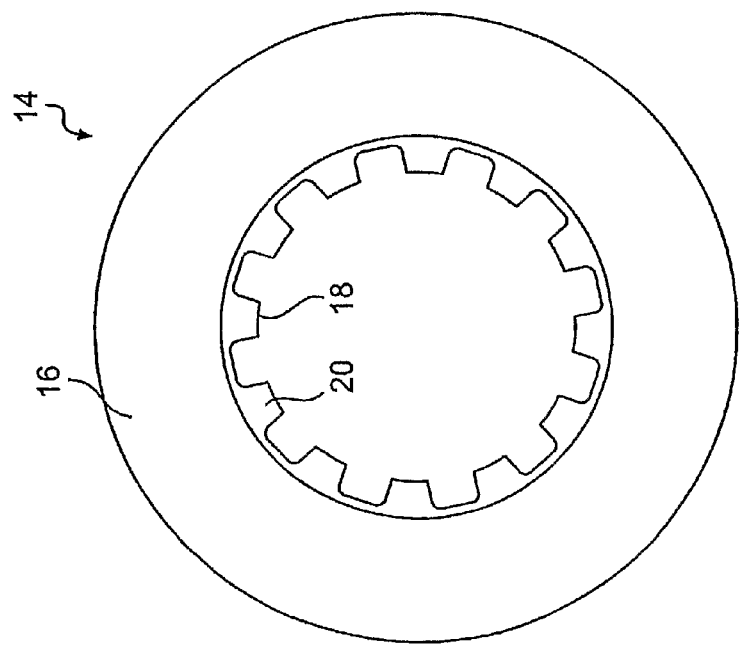
FIG. 16 is a top view of the rotor in accordance with the invention for use with the first embodiment of the package bearing.

One difference between rotor 14, in accordance with this invention, and conventional rotors is that the attachment flange 18 has a series of spaced radial tabs 20, as seen in FIG. 16. The rotor tabs 20 are preferably formed as solid projections, with no aperture needed for fasteners as in conventional two-piece or floating rotors. However, the rotor tabs 20 could have apertures if desired without affecting the operation of the invention. The important feature of the rotor tabs 20 is that each tab presents a side surface, which extends radially, that is driven by the wheel hub, as discussed below.

Figure 10:
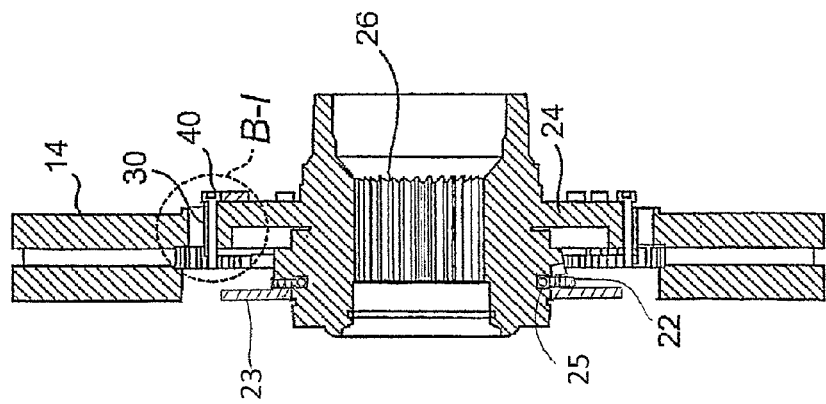
FIG. 10 is a side view in cross section taken along line A-I in FIG. 9.
Figure 9:
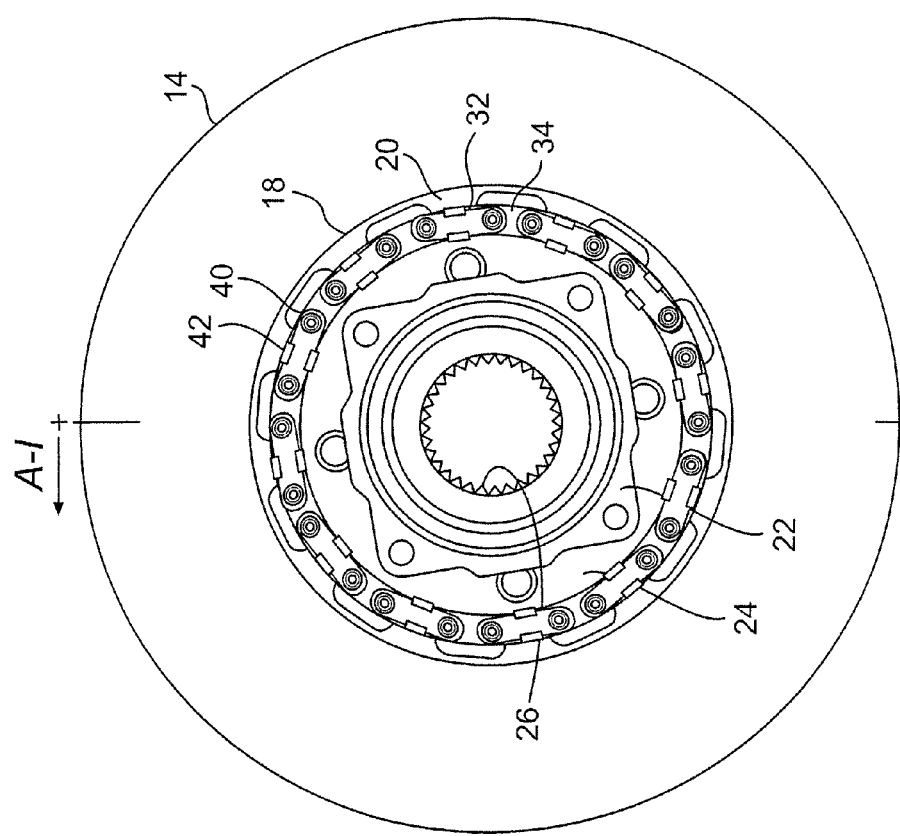
FIG. 9 is a top view of the package bearing and rotor of FIG. 1.

Package bearing 12 has an integral hub and connects to the vehicle frame and the wheels. The package bearing 12 includes a fixed upright mounting portion 22 that connects to the upright 23 of the vehicle frame and a wheel mounting portion 24 that connects to the wheel studs. The interior of the package bearing 12 receives the drive or driven shaft of the drive train. As seen in FIGS. 9 and 10, for example, splines 26 engage with the driving shaft. This package bearing 12 is connectable to front wheel drive, rear wheel drive or all wheel drive vehicles. Within the package bearing casing 12 are lubricated bearings 25 that allow the wheel mounting portion 24 to turn with respect to the upright mounting portion 22, as is known.

In operation, brake pads, not shown, are selectively pressed against the braking surface 16 of rotor disc 14 to slow or stop rotation of rotor disc 14, and thus slow or stop rotation of the attached wheel mounting portion 24 and the associated vehicle wheel.

Figure 11:
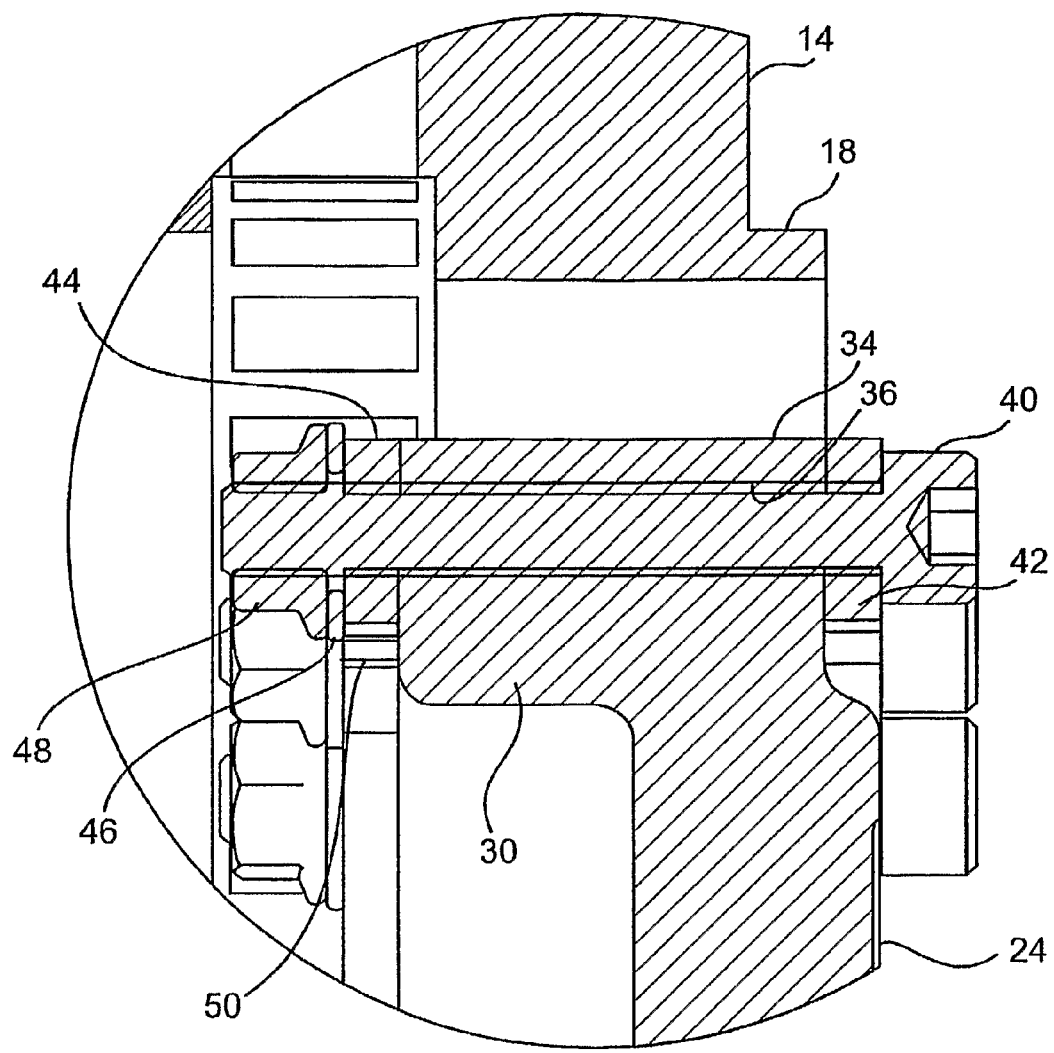
FIG. 11 is an enlarged view of section B-I of FIG. 10.
Figure 14:
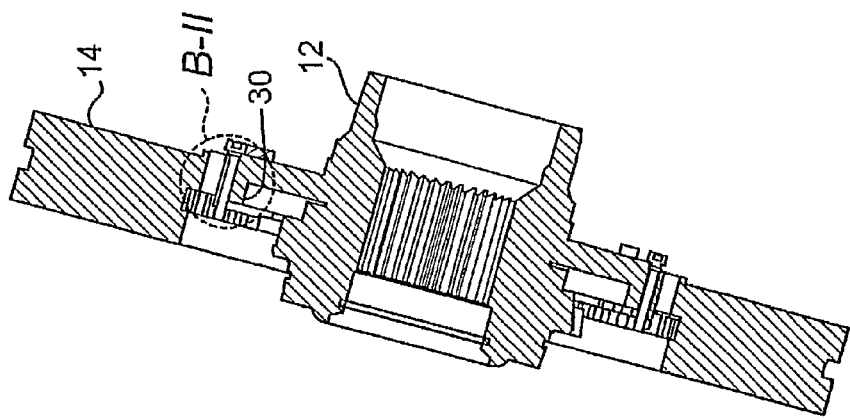
FIG. 14 is a side view in cross section taken along line A-II of FIG. 13.
Figure 13:
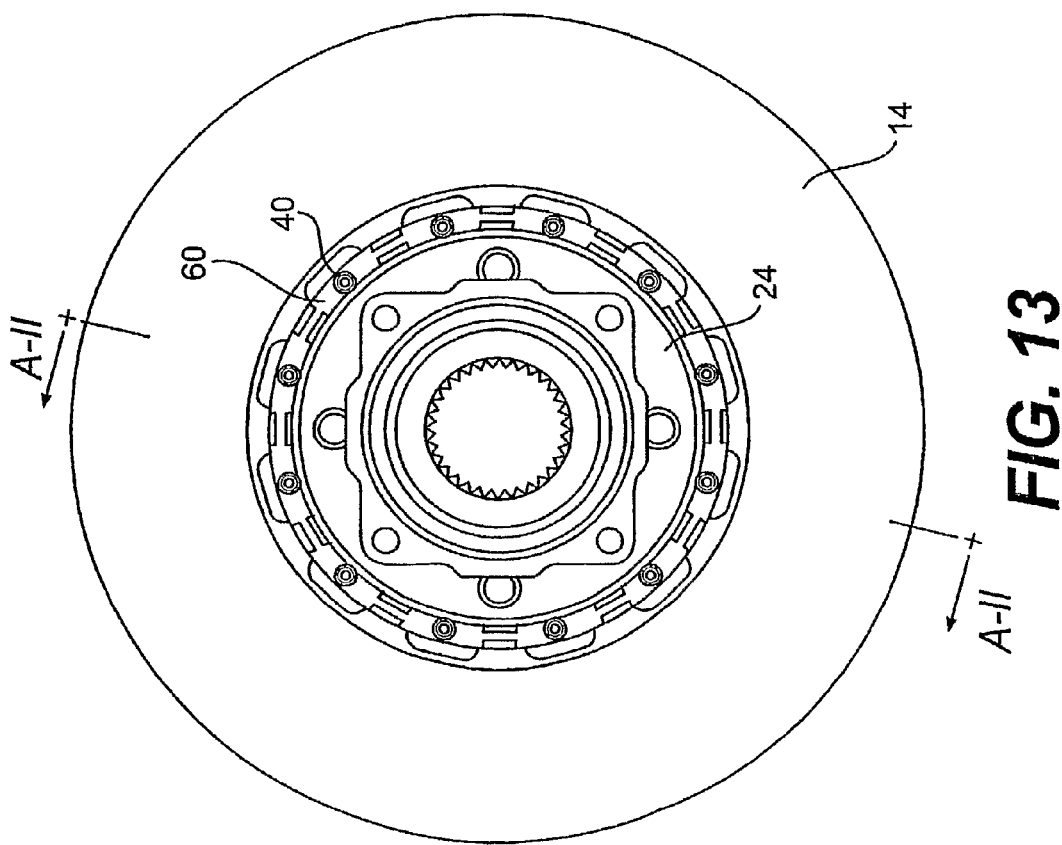
FIG. 13 is a top view of the package bearing and rotor of FIG. 12.
Figure 15:
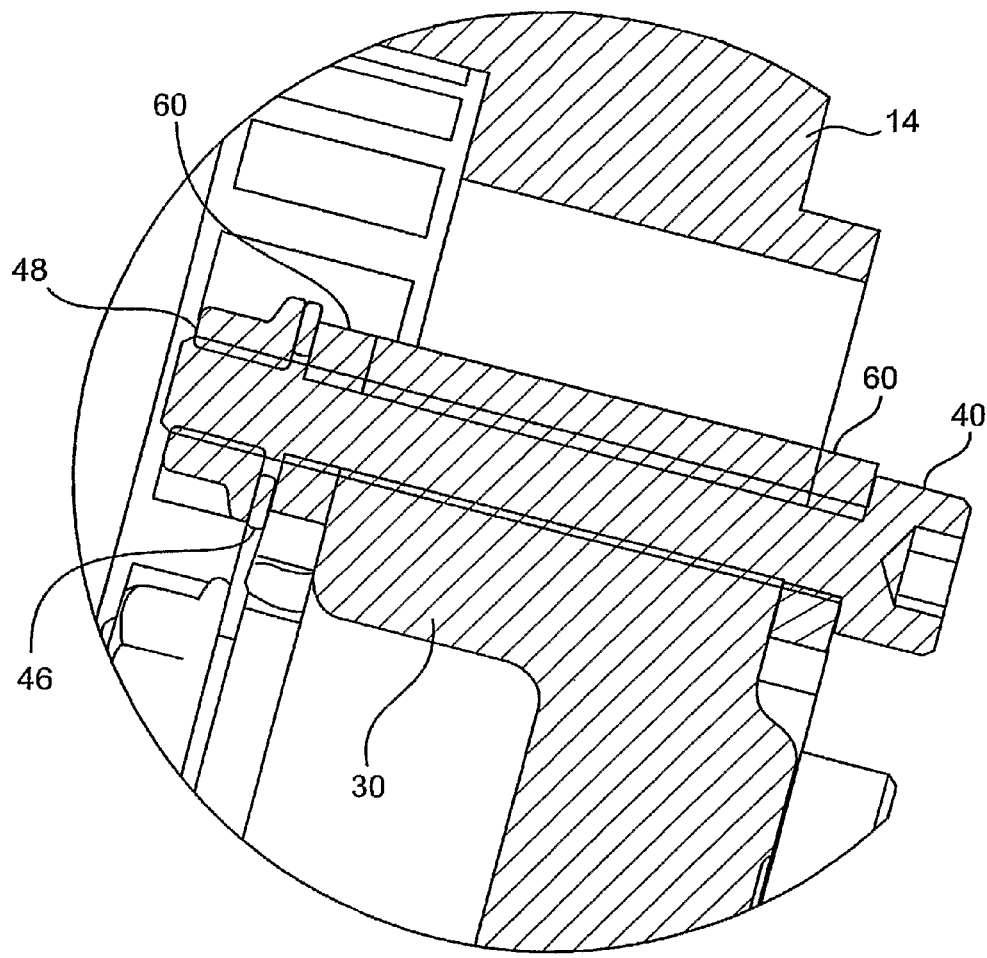
FIG. 15 is an enlarged view of section B-II of FIG. 14.
Figure 17:
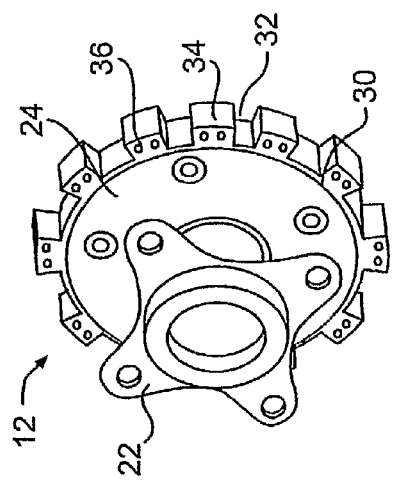
FIG. 17 is a top perspective view of the package bearing in accordance with the first embodiment.
Figure 18:
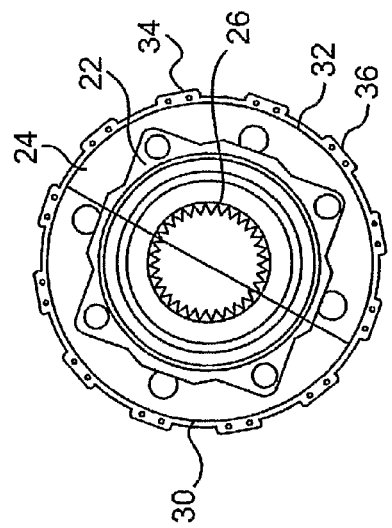
FIG. 18 is top view of the package bearing of FIG. 17.

The package bearing 12 in accordance with the first embodiment of the invention has a disc brake rotor mounting flange formed as a shoulder 30 on the edge of the wheel mounting portion 24, as best seen in FIGS. 10 and 11, for example. As seen, the shoulder 30 extends outwardly away from the wheel mounting surface of the bearing 12. The shoulder 30 has slots 32 formed therein that create spaced shoulder tabs 34, as best seen in FIGS. 17 and 18, which have a pair of apertures 36 formed therein. Each pair of adjacent shoulder tabs 34 define a through slot 32 therebetween that has no top or bottom wall. The slots 32 can be milled or machined.

To assemble the rotor disc 14 to the package bearing 12, as can be appreciated by FIG. 1, the rotor disc 14 is mounted on the package bearing 12 such that mounting rotor tabs 20 of the rotor disc 14 are received in the slots 32 of the shoulder 30 in an interlocking arrangement as seen in FIG. 9. Then, a threaded fastener, such as bolt 40 is inserted through a bridge 42 that spans the slot 32 between a pair of shoulder tabs 34 over a mounting rotor tab 20. A bolt 40 is inserted through an aperture 36 in a shoulder tab 34 on both sides of the slot 32 to clamp the bridge 42 over a mounting rotor tab 20. Another bridge 44 is positioned on the opposed side of the mounting rotor tab 20. Each bolt 40 is then secured with a washer 46 and nut 48. Preferably, a spacer or spring clip 50 is positioned on one of the bridges 42 or 44 to bias the mounting rotor tab 20 against the bridge 42 or 44. Bridge 42, 44 is formed in accordance with the first embodiment of the bridge component.

As seen in FIG. 11, the shoulder 30 is wider than the mounting flange 18 of the rotor. The mounting rotor tabs 20 are also slightly smaller than the slots 32. By this, there is a small clearance between the rotor mounting flange 18 and the shoulder 30 in each direction that allows the disc 14 to "float" to accommodate thermal expansion. The spring clip 50 controls the clearance and maintains a tight connection. Further, since the spring clip 50 is compressed against the rotor tab 20 upon assembly, the rotor tab 20 will not rattle due to the clearances described above. This configuration also has the advantage of only compression loading the spring clip 50. The spring clip 50 is not restrained in the circumferential direction or the radial direction of the rotor 14 and therefore does not experience torsional and bending loading, which could cause a spring to fail.

Details of the fastener components, including bolt 40, bridges 42, 44, washer 46, nut 48 and clip 50 are shown in FIGS. 2-8. The clip 50 is configured with arms 52 that snap onto the bridge 42, 44 and outwardly splayed wings 54 that act as springs. The spring clip 50 can be preassembled onto the bridge 44 for ease of assembly. Of course, the spring clip 50 can be assembled onto either bridge 42 or 44. It is possible to use other configurations of a spacer or spring clip that would function in a similar manner.

The rotor 14 may be made of cast iron while the bridge may be made of stainless steel powdered metal, which has a tensile strength of about 70 ksi and a yield strength of about 45 ksi. This is almost double the strength of the material used for the rotor 14. Stainless steel is also more durable with respect to high temperature than cast iron. Yield strength tends to drop as material is heated, but the yield strength of stainless steel drops more slowly with increasing temperature than the yield strength of cast iron, which drops quickly with increasing temperature. Preferably, the bridge 42, 44 is made of powdered stainless steel or coated carbon steel. Stainless steel also offers corrosion resistance.

This invention offers the advantage of a lower rotor failure rate. As the rotor 14 in accordance with this invention has rotor tabs 20 for attachment, rather than perforations as in conventional rotors, failure of the attachment flange 18 is greatly reduced. In conventional rotors, the attachment flange has a plurality of apertures that receive fasteners. As the rotor is heated due to the braking force, the strength of the flange drops as cast iron has a low fatigue strength. In the perforated flange, which is typically made of cast iron, the connection between the fastener and the perforated flange induces stress concentrations on the edge of the perforations. As a result, the flange tends to fail. In this invention, use of the perforations for making the connection is eliminated. The rotor is driven through the radial side edges of the rotor tabs 20, which are stronger and accordingly resist failure.

Another aspect of this invention relates to the interaction between the rotor tabs 20 and the fastening components. In operation, the rotor disc 14 rotates with the wheels of the vehicle. Upon application of a braking force by pressing brake pads against the braking surface 16, the friction force times the distance from the center of the piston to the center of the disc creates torque. The torque is transferred from the rotor 14 to the wheel mounting flange 24 and to the wheel to effect braking. Specifically, torque is transferred through the attachment flange 18 and rotor tabs 20 to the shoulder tabs 34. The rotor tabs 20 transfer the torque to the shoulder tabs 34 of the package bearing 12, which then transfer it to the wheels through the wheel mounting flange 24. The interaction between the side edges of the rotor tabs 20 and the shoulder tabs 34 will only allow in-plane torque transfer, which reduces the twisting moment on the rotor flange 18.

A significant advantage that this configuration has over prior art configurations is that the connection of the package bearing 12 to the rotor disc 14 is effected in the same plane as the rotor disc 14. By clamping the rotor tab 20 of the attachment flange 18 of the rotor disc 14 with the fastening assembly, including the fastener 40 and the bridge 42, 44, the friction force experienced by the braking surface 16 is transferred as torque directly in the same plane to the wheel mounting flange 24. As the connection created by the fastener assembly is in axial alignment with the rotor disc 14, no moment arm is created. This transfers the torque without bending, which can create problems with run-out and premature fracture.

FIGS. 12-15 show a second embodiment of the bridge component in which the bridge 42 of FIG. 1 is formed as an annular ring 60. This reduces the number of parts required in the assembly and provides for easier installation. The ring 60 can be made of the same materials as the bridge, noted above, and may be stamped for ease of manufacture. In this embodiment, less bolts 40 are also used as only one aperture 62 in each shoulder tab 34 is required. Thus, less machining is required for the package bearing as well. Of course, in this embodiment and first embodiment, the bolts 40 may be inserted from either side.

Figure 19:
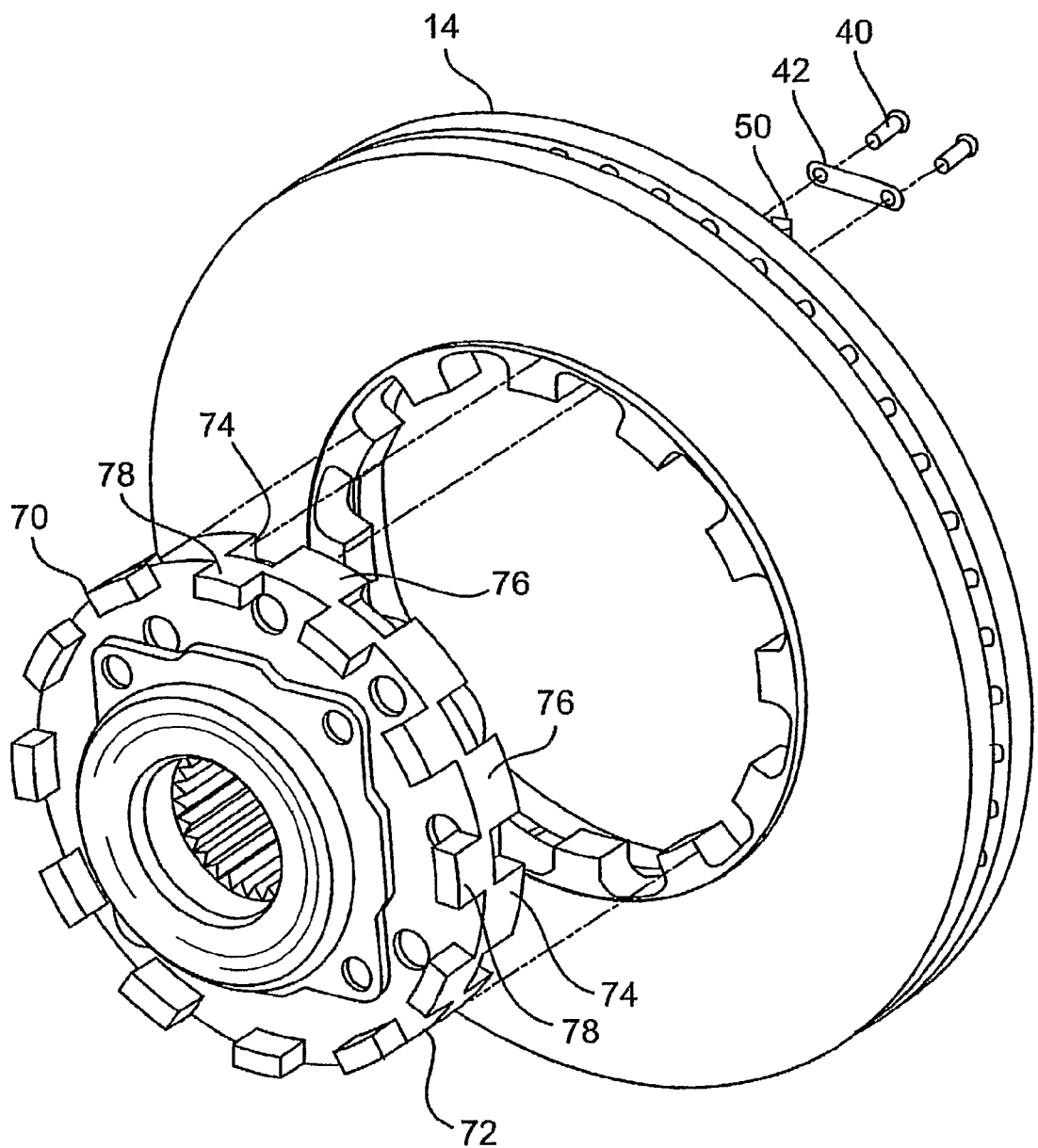
FIG. 19 is an exploded side perspective view of the package bearing and rotor in accordance with a second embodiment of the package bearing used with the first embodiment of the bridge component.
Figure 21:
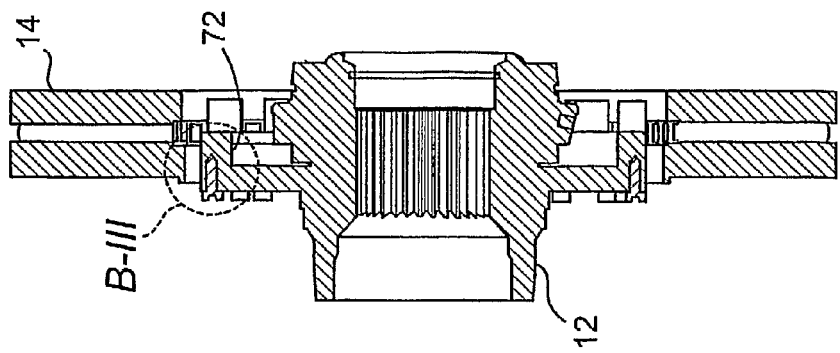
FIG. 21 is side view in cross section taken along line A-III of FIG. 20.
Figure 20:
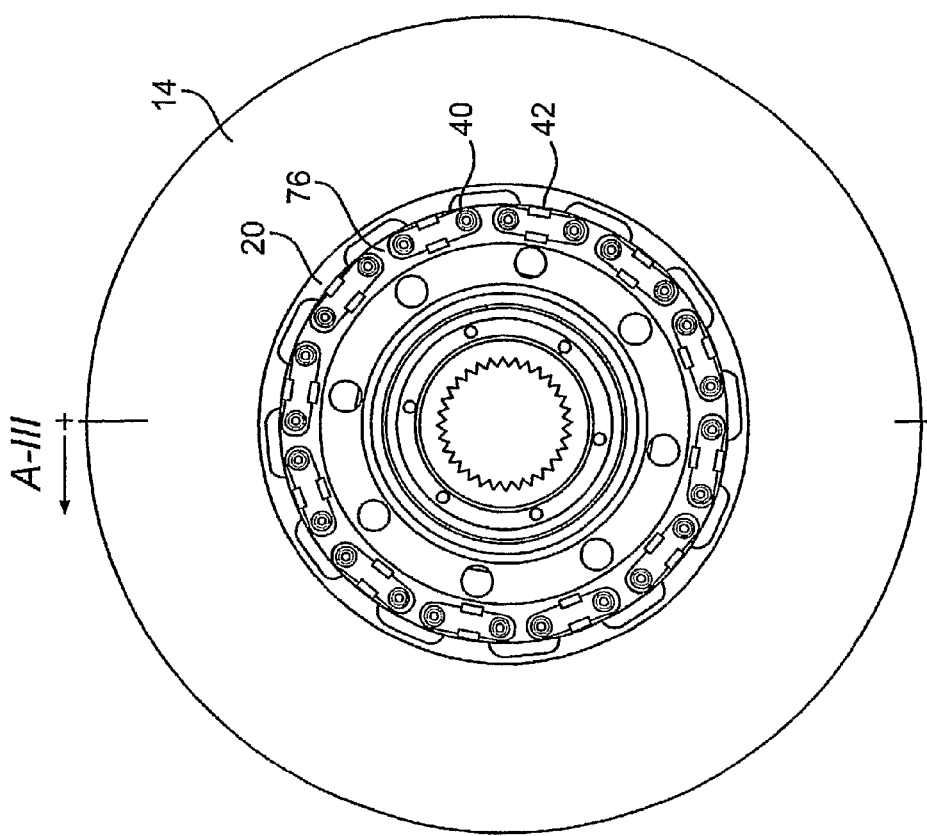
FIG. 20 is a top view of the package bearing and rotor of FIG. 19.
Figure 22:
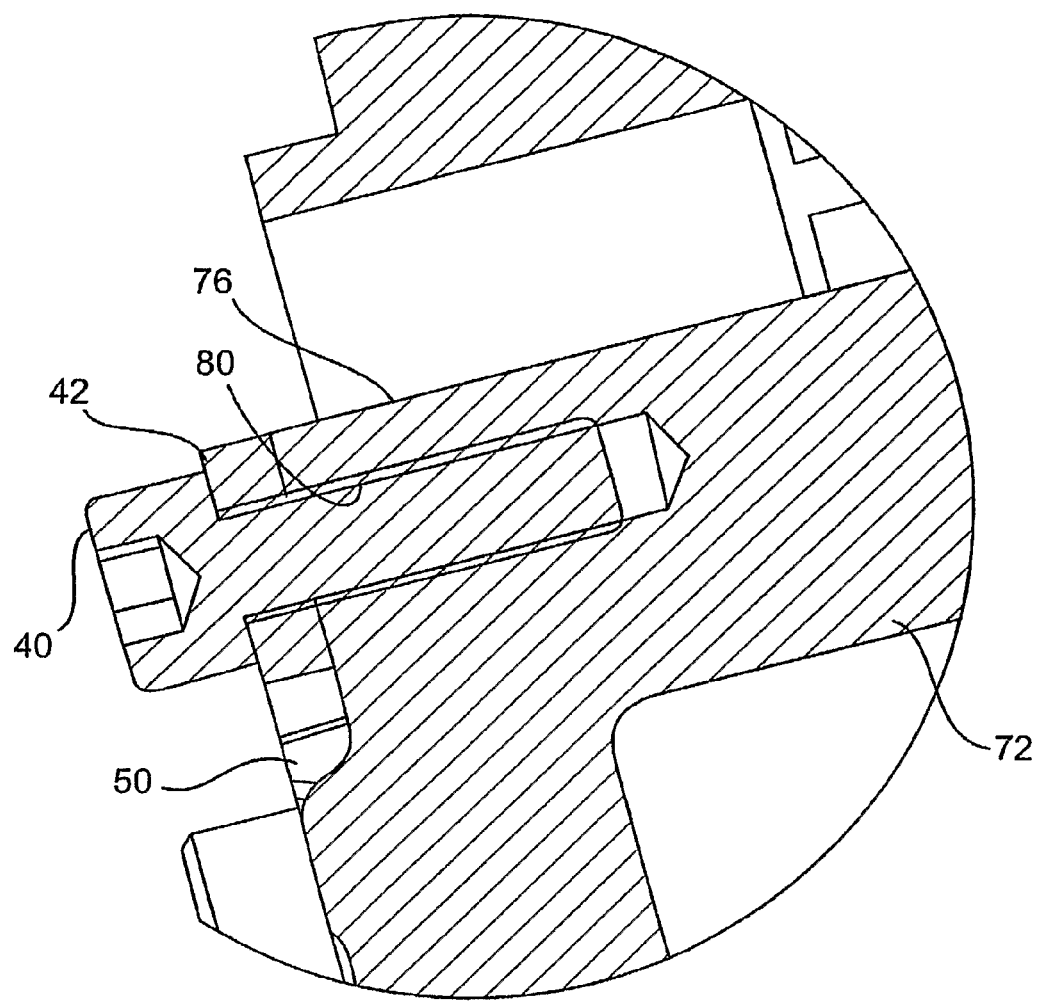
FIG. 22 is an enlarged view of section B-III of FIG. 21.
Figure 23:
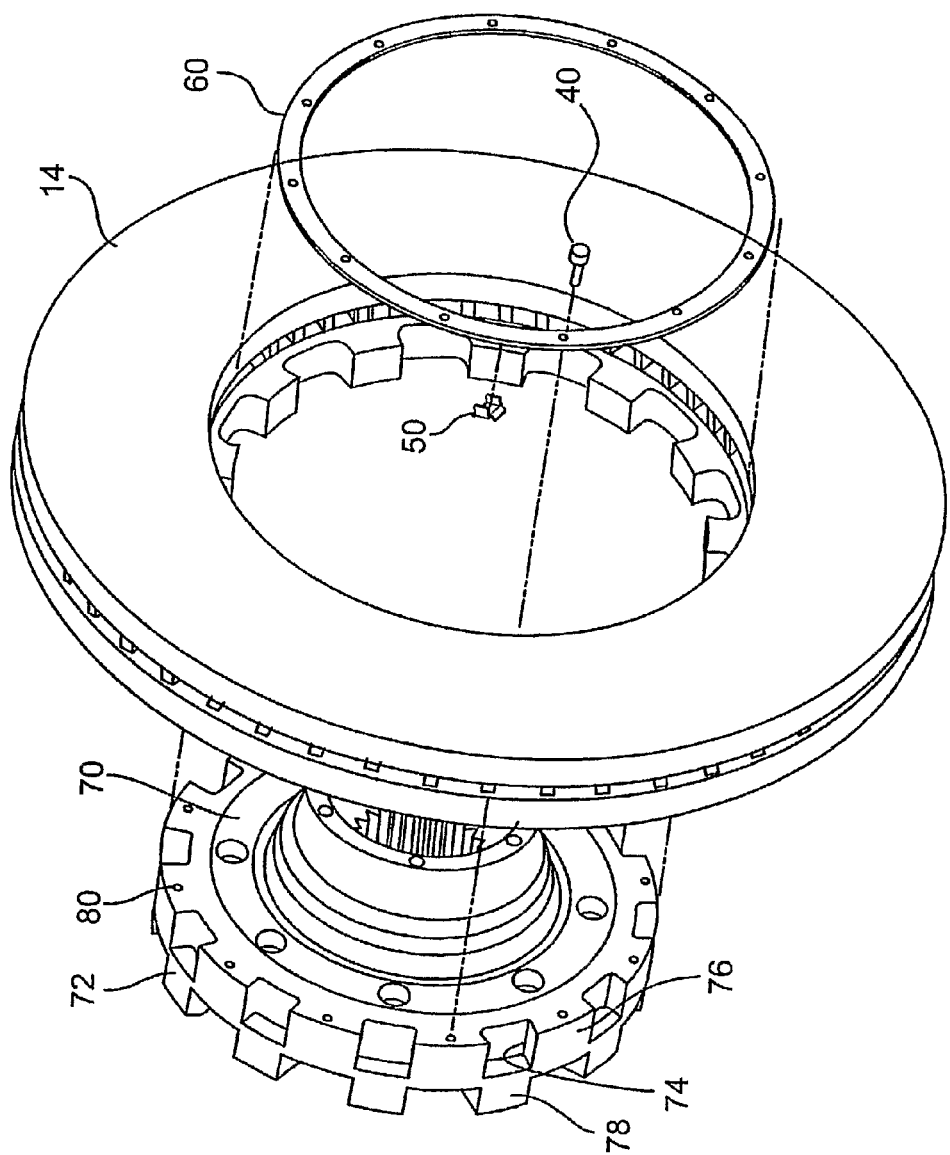
FIG. 23 is an exploded side perspective view of the second embodiment of the package bearing and rotor with the second embodiment of the bridge component of the invention.
Figure 25:
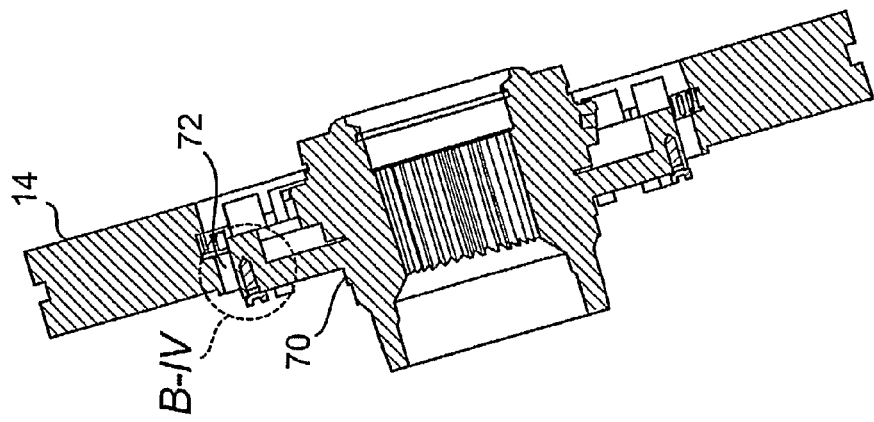
FIG. 25 is a side view in cross section taken along line A-IV of FIG. 24.
Figure 24:
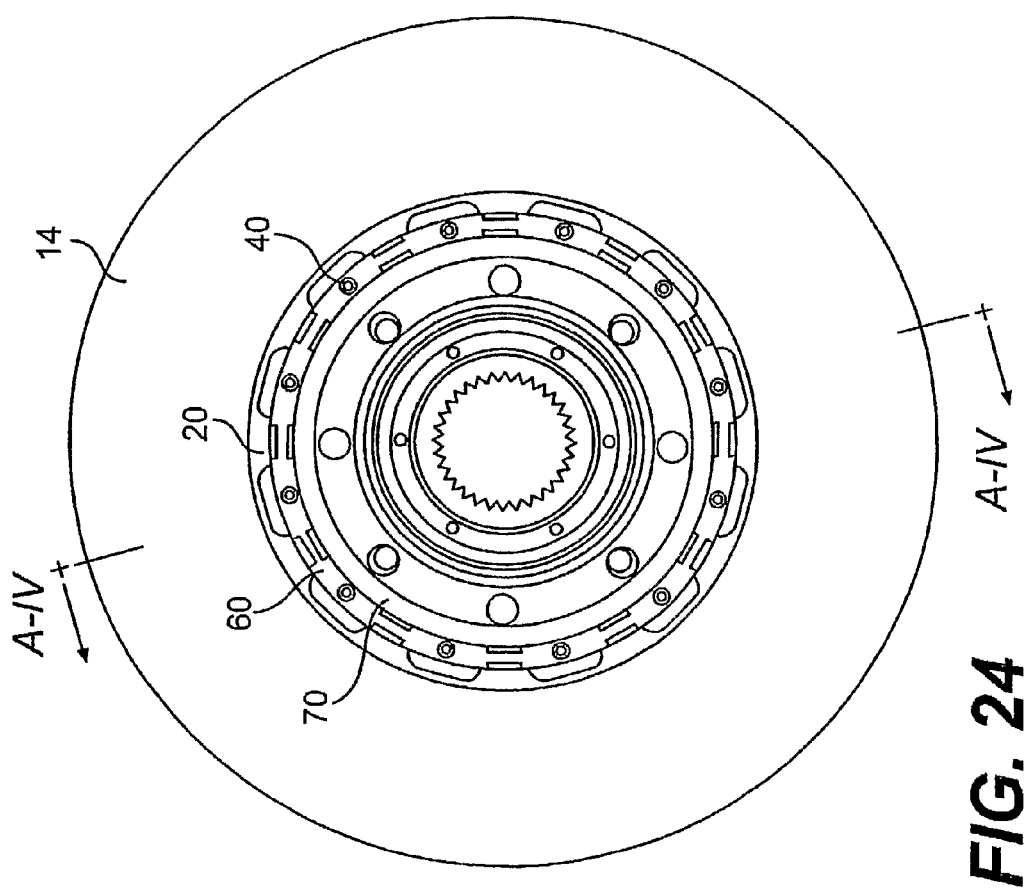
FIG. 24 is a top view of the package bearing and rotor of FIG. 24.
Figure 26:
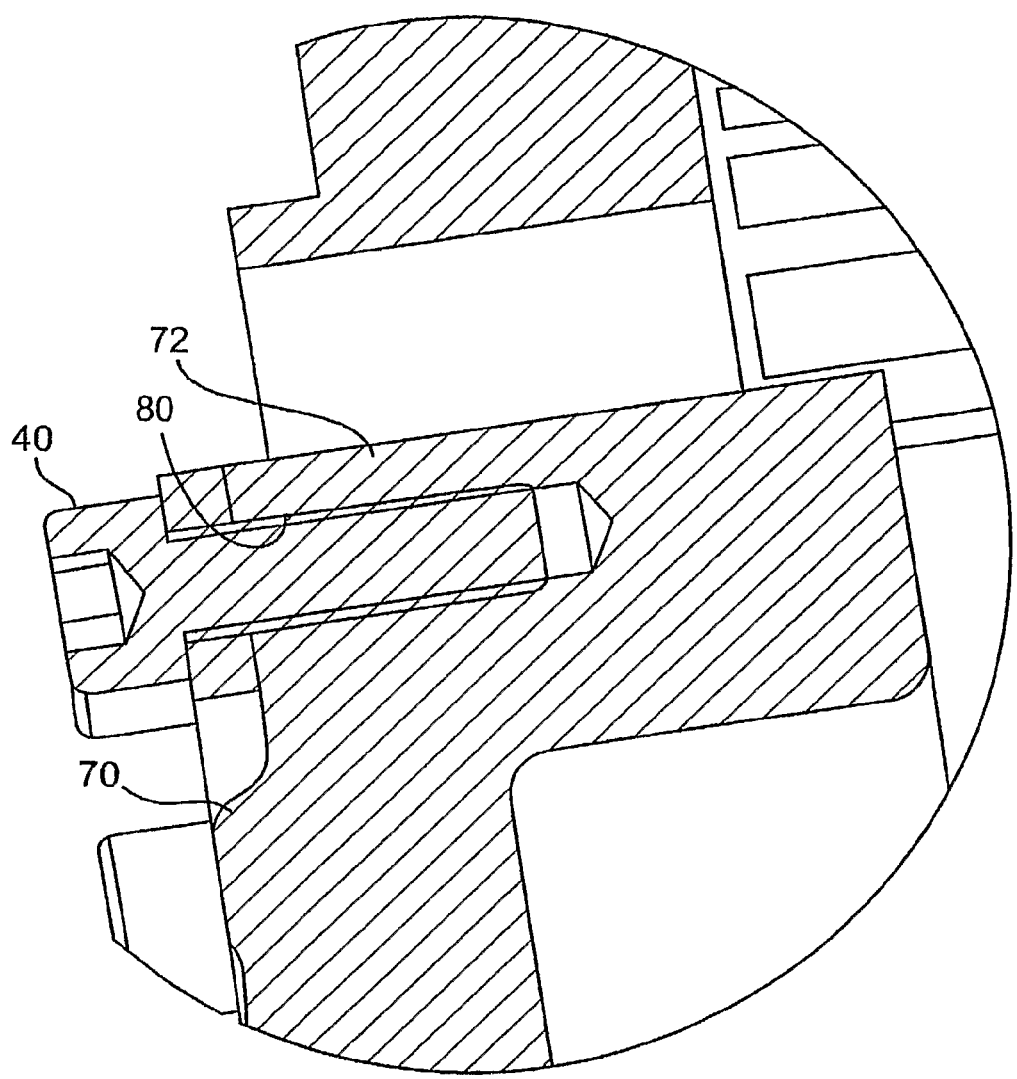
FIG. 26 is an enlarged view of section B-IV of FIG. 25.
Figure 28:
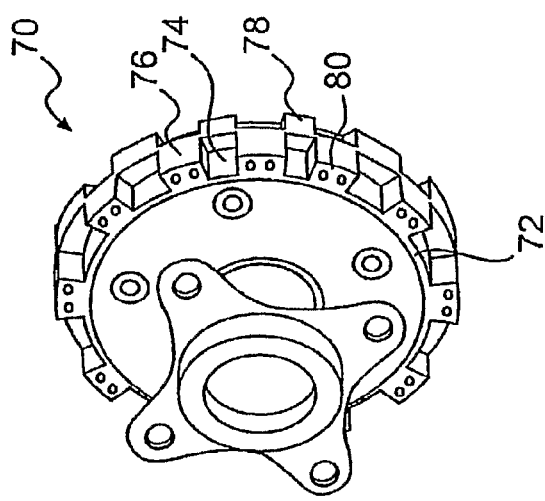
FIG. 28 is top perspective view of the package bearing in accordance with the second embodiment of the invention; and, FIG. 29 is a top view of the package bearing of FIG. 28.
Figure 29:
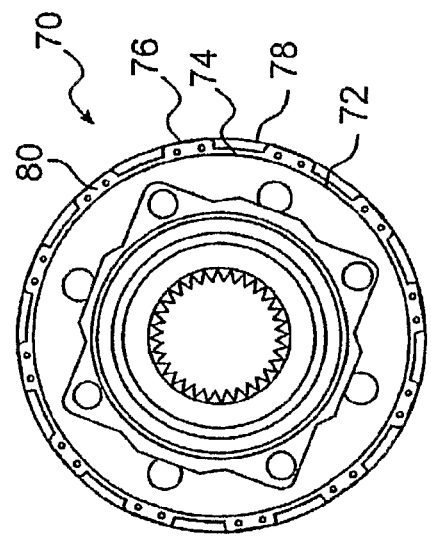
Figure 27:
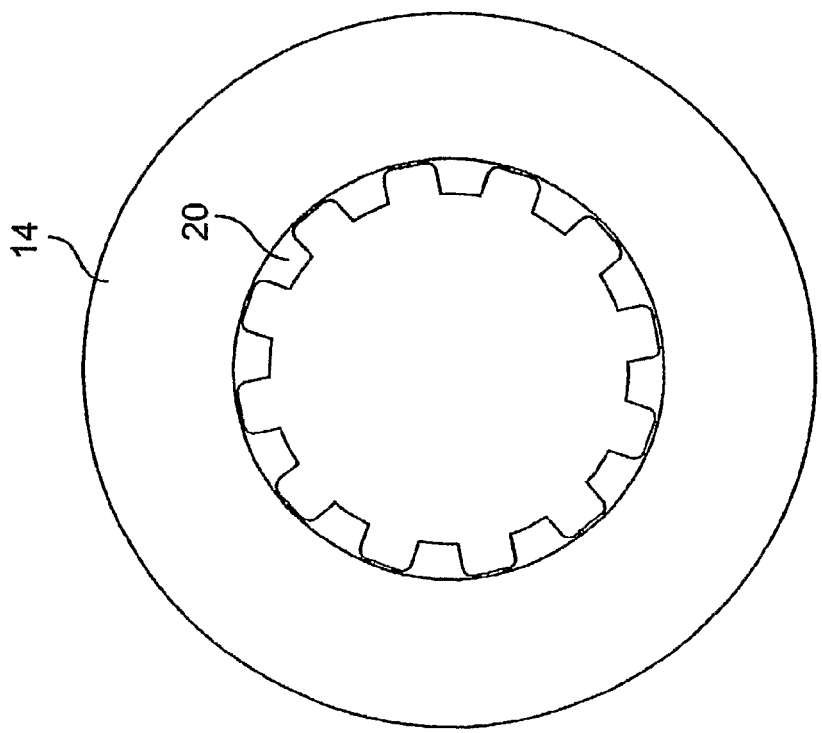
FIG. 27 is rotor in accordance with the invention for use with the second embodiment of the package bearing.

FIGS. 19-22 show a second embodiment of the package bearing of the invention, which is similar to that shown in FIG. 1, except that the slots on the shoulder of the package bearing are made by fine-blanking or stamping. This leaves a residual piece that extends below the slot. Additionally, the apertures in the shoulder tabs may be tapped. Referring to FIG. 19, the rotor disc 14 is the same as seen in FIGS. 1 and 16. The package bearing 70 has a shoulder 72 that has slots 74 formed therein by fine-blanking or stamping to create shoulder tabs 76 and residual steps 78 below each slot 74 that creates a bottom wall for the slot 74, as best seen in FIGS. 28 and 29. Apertures 80 are tapped into the shoulder tabs 76. The remaining elements, including the fastening assembly with bridges 42 and bolts 40 remain the same. Of course, there is no need for additional bridges 44, washers 46 or nuts 48 in this embodiment, which is an advantage in terms of cost and assembly time.

The configuration shown in FIGS. 23-26 is similar to the second package bearing embodiment of FIGS. 19-22 in the way the slots 74 are formed but uses a ring 60 in the same manner as the configuration of FIGS. 12-15. Again, it can be appreciated that less bolts and springs can be used, in addition to eliminating the need for a second ring, washers and nuts.

This invention allows a bearing manufacturer to modify the package bearing with the rotor mounting shoulder and be fully compatible with a tabbed rotor. The additional fastening components required are minimal and include a bridge or ring, bolts and a spring clips and, in some instances, washers and nuts. It can be appreciated that this arrangement offers significant cost savings in terms of ease of manufacture, ease of assembly, and reduced parts. Further, there is no need for a hat to connect the rotor to the hub. Thus, a secure connection can be obtained that offers low cost and reduced stresses associated with the fastening assembly.

The invention is not limited to those embodiments described herein and may encompass various changes and modifications. It will be understood that the various modifications shown herein can be used in any combination. It is also possible to eliminate various components of the assembly and still have an effective connection. For example, the spring may be omitted. Further, different materials may be used to obtain similar results.

What is claimed is:

1. A vehicle wheel hub and bearing assembly comprising:
   a single disc brake rotor having a braking surface and an attachment flange, wherein the attachment flange has a plurality of rotor tabs;
   a package wheel bearing hub having a wheel mounting flange and a disc brake rotor mounting flange with a surface for attachment to a disc brake rotor, wherein the disc brake rotor mounting flange has a shoulder with shoulder tabs for engagement with the rotor tabs, and the package wheel bearing hub and disc brake rotor mounting flange are integrally constructed as one piece; and
   a fastener means for coupling the attachment flange of the disc brake rotor to the disc brake rotor mounting flange of the package wheel bearing hub to provide radial movement between the attachment flange and the disc brake rotor mounting flange to accommodate thermal expansion, wherein the fastener means includes a bridge for clamping and securing the rotor tabs between the shoulder tabs, and
   wherein each radially oriented surface of the rotor tabs and shoulder tabs directly contact one another, and wherein the disc brake rotor mounting flange and the wheel mounting flange are substantially coplanar.

2. The assembly of claim 1, further comprising a plurality of bridges, each having a pair of apertures that each receives a fastener.

3. The assembly of claim 1, wherein the rotor tabs are solid.

4. The assembly of claim 1, wherein at least some of the shoulder tabs have a through hole.

5. The assembly of claim 1, wherein at least some of the shoulder tabs have a tapped hole.

6. The assembly of claim 1, wherein the bridge is an annular ring.

7. The assembly of claim 1, wherein the shoulder tabs define through slots between adjacent shoulder tabs.

8. The assembly of claim 1, wherein the shoulder tabs define blank slots having a bottom wall between adjacent shoulder tabs.

9. The assembly of claim 1, wherein the shoulder tabs are wider in the axial direction than the rotor tabs.

10. The assembly of claim 1, wherein the fastener means includes a spring disposed between the bridge and an associated rotor tab of the single disc brake rotor to resiliently bias the rotor tab with respect to the bridge, wherein the spring is separate from the bridge.

11. The assembly of claim 10, wherein the spring directly contacts the bridge.

12. The assembly of claim 1, wherein the shoulder tabs of the disc brake rotor mounting flange define blank slots having a bottom wall between adjacent shoulder tabs and the bridge includes an annular ring that traps the rotor against the bottom wall between the adjacent shoulder tabs.

13. The assembly of claim 12, wherein the fastener means includes a spring is separate from the annular ring.

14. A package wheel bearing hub for use in a vehicle wheel assembly that includes a brake rotor, comprising:
   a wheel bearing hub;
   a mounting portion supported by the wheel bearing hub for connection to a vehicle frame; and
   a rotatable wheel mounting portion supported by the wheel bearing hub for rotation, wherein the wheel mounting portion includes a wheel mounting flange with a surface for attachment to the vehicle wheel and a disc brake rotor mounting flange for engagement with the brake rotor,
   wherein the wheel bearing hub and the disc brake rotor mounting flange are integrally constructed as one piece and the disc brake rotor mounting flange has a shoulder with shoulder tabs formed therein defining a plurality of blank slots between adjacent shoulder tabs having a bottom wall configured to connect with the brake rotor,
   a fastener means for coupling a plurality of rotor tabs of the disc brake rotor to the slots of the disc brake rotor mounting flange of the package wheel bearing hub to provide radial movement between the brake rotor tabs and the disc brake rotor mounting flange to accommodate thermal expansion, wherein the fastener means includes a bridge connected at opposite ends across a slot of the disc brake rotor mounting flange, and
   wherein each radially oriented surface of the rotor tabs of the brake rotor and shoulder tabs of the disc brake rotor mounting flange directly contact one another, and wherein the disc brake rotor mounting flange and the wheel mounting flange are substantially coplanar.

15. The package wheel bearing hub of claim 14, wherein each shoulder tab has a tapped hole.

16. The package wheel bearing hub of claim 14, wherein the shoulder tabs are wider in the axial direction than the rotor tabs.

17. The package wheel bearing hub of claim 14, wherein the fastener means includes a spring that is separate from the bridge.

18. The package wheel bearing hub of claim 17, wherein the spring directly contacts the bridge.

19. The package wheel bearing hub of claim 14, wherein said fastener means includes fasteners extending through the bridge and connected to shoulder tabs, and a spring disposed between said bridge and said one rotor tab of the brake rotor.

20. The package wheel bearing hub of claim 14, wherein the shoulder tabs of the disc brake rotor mounting flange define the blank slots having the bottom wall between adjacent shoulder tabs and the bridge includes an annular ring that traps the rotor against the bottom wall between the adjacent shoulder tabs.

21. A vehicle wheel hub and bearing assembly comprising:
   a single disc brake rotor having a braking surface and an attachment flange, wherein the attachment flange has a plurality of rotor tabs;
   a mounting portion supported by the wheel bearing hub for connection to a vehicle frame;
   a wheel bearing hub having a wheel mounting flange and a disc brake rotor mounting flange with a surface for attachment to a disc brake rotor, wherein the disc brake rotor mounting flange has a shoulder with shoulder tabs for engagement with the rotor tabs, and the wheel bearing hub and disc brake rotor mounting flange are integrally constructed as one piece; and
   a fastener means for coupling the attachment flange of the disc brake rotor to the disc brake rotor mounting flange of the wheel bearing hub to provide radial movement between the attachment flange and the mounting flange to accommodate thermal expansion, wherein the fastener means includes a bridge and fastener, the fastener fastening the bridge to clamp over the rotor tabs and securing the rotor tabs between the shoulder tabs, and
   wherein each radially oriented surface of the rotor tabs and shoulder tabs directly contact one another, and wherein the disc brake rotor mounting flange and the wheel mounting flange are substantially coplanar.

\* \* \* \* \*